March 16, 1943.  W. H. PRATT  2,314,244

VOLT-AMPERE DEMAND RECORDER

Filed April 30, 1941  2 Sheets-Sheet 1

Inventor:
William H. Pratt,
by Harry E. Dunham
His Attorney.

March 16, 1943. W. H. PRATT 2,314,244
VOLT-AMPERE DEMAND RECORDER
Filed April 30, 1941 2 Sheets-Sheet 2

Inventor:
William H. Pratt,
by Harry E. Dunham
His Attorney.

Patented Mar. 16, 1943

2,314,244

UNITED STATES PATENT OFFICE 2,314,244

VOLT-AMPERE DEMAND RECORDER

William H. Pratt, Lynn, Mass., assignor to General Electric Company, a corporation of New York Application April 30, 1941, Serial No. 391,145

2 Claims. (Cl. 171—95)

My invention relates to apparatus for measuring and recording the product of two quantities such for example as the volt-amperes of power circuits and its object is to provide a relatively inexpensive yet reliable recorder which uses a minimum of recording chart. My recorder will not only record maximum and minimum demands of volt-amperes but will also record the value of voltage and current at which such demands occur and in addition gives a general picture of the nature of the volt-ampere load, and the current and voltage variations over the period of measurement. The current and voltage responsive devices are preferably of the thermal type and hence such a meter may be used on either direct or alternating current circuits. The recording chart is advanced or changed only at the end of the demand measurement period and hence a clock device for advancing the chart becomes unnecessary.

Figure 2:
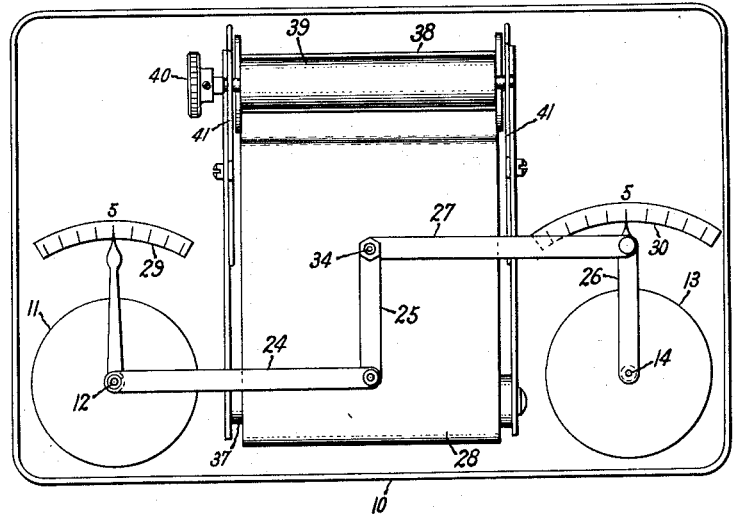
Figure 1:
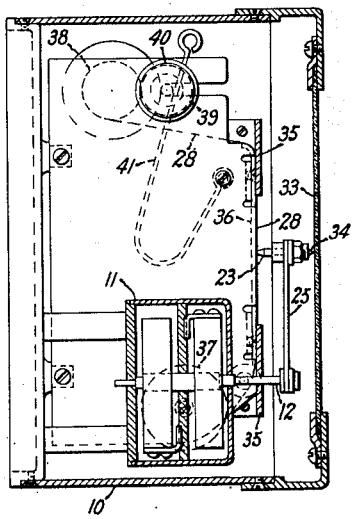
Figure 3:
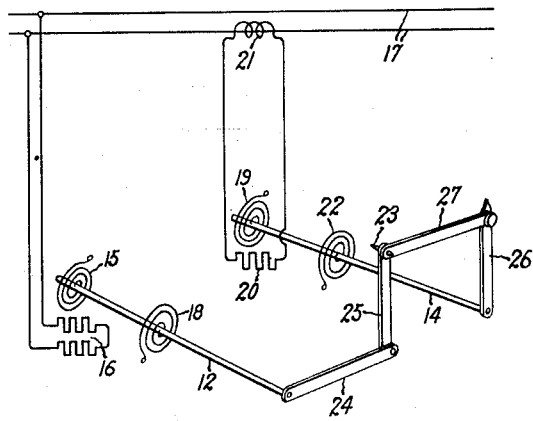
Figure 4:
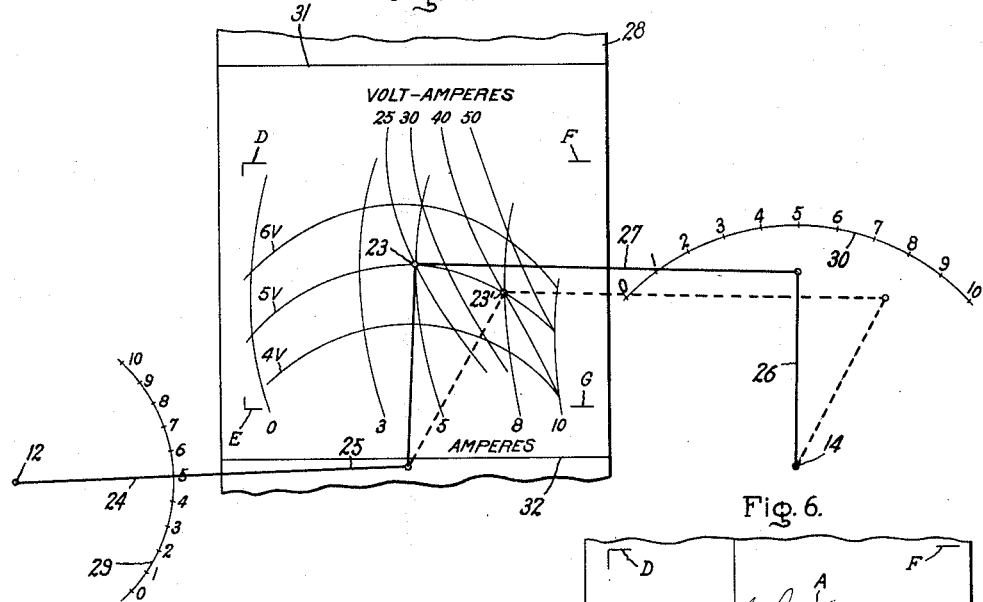
Figure 5:
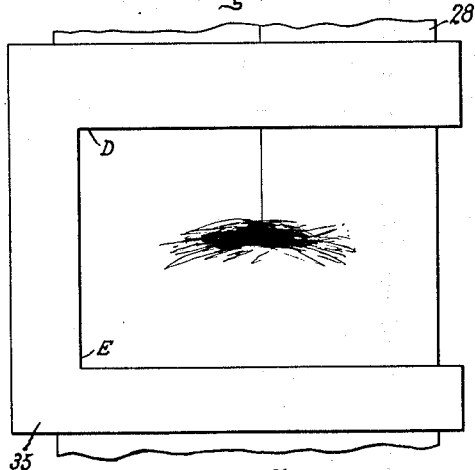
Figure 7:
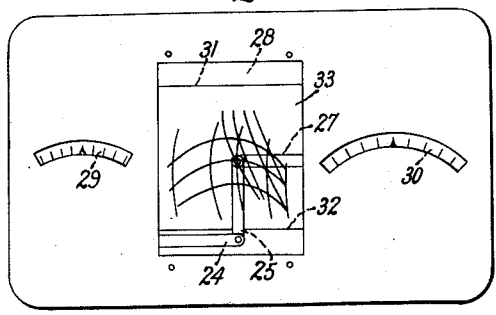
Figure 6:
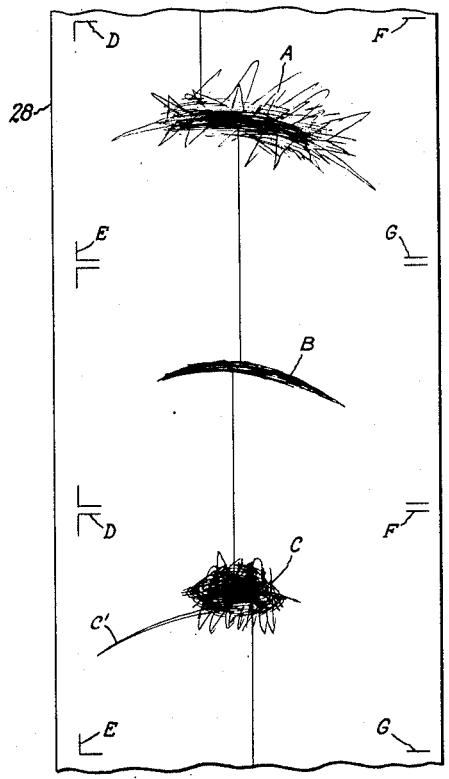

The features of my invention which are believed to be novel and patentable will be pointed out in the claims appended hereto. For a better understanding of my invention reference is made in the following description to the accompanying drawings in which Figs. 1 and 2 show sectional side and front views respectively of recorder mechanism embodying my invention. Fig. 3 represents the electrical connection of the thermal elements. Fig. 4 is an explanatory diagram which will be referred to in explaining the operation of the recorder and the nature and calibration of the record obtained. Fig. 5 shows a marking plate which may be used about the recording area, Fig. 6 shows the general character of the records obtained by my invention, and Fig. 7 shows a front view of the encased meter.

Figure 1 shows a side view and Figure 2 a front view of a thermal volt-ampere demand recorder embodying my invention. In these figures, parts of the casing 10 and other view-obstructing elements have been omitted in order to show the general interior arrangement. Contained in a suitable housing 11 is a thermal responsive device compensated for ambient temperature changes for turning a shaft 12 in preferably a counter-clockwise direction by an amount proportional to the voltage of the circuit to be metered. Another housing 13 of like character contains a thermal responsive device compensated for ambient temperature changes for turning a shaft 14 preferably in a clockwise direction by an amount proportional to the current of the circuit to be metered.

My invention is not concerned with the details of such thermal responsive devices but they are preferably of the character represented in Fig. 3. The voltage responsive device for turning shaft 12 may comprise a bimetal spiral 15 having its outer end stationary and its inner end secured to shaft 12 and arranged when heated by a heater resistance 16 to produce a counter-clockwise torque on the shaft. The resistance 16 is energized by being connected across the circuit 17 to be metered. A second bimetal spiral 18, subject only to changes in ambient temperature, has its inner end secured to shaft 12 and its outer end stationary and is coiled about the shaft in a direction to oppose the torque of spiral 15 when heated. The two spirals have such heat response relation as to produce no resultant torque on shaft 12 due to ambient temperature changes. Hence the turning of shaft 12 is due to voltage responsive heating alone. 19 indicates a bimetal spiral heated by a heater 20 energized in response to the load current in line 17. In this case I have indicated a current transformer 21 through which heater 20 is energized. This current responsive element is also compensated for ambient temperature changes by a spiral 22 and the arrangement is such as to produce a clockwise turning of shaft 14 in response to the load current magnitude.

In explaining my invention, I will assume that the amount of rotation of the two shafts from zero voltage and current condition is 90 degrees over the load range contemplated and that the relation between energizing current and deflection is linear. Neither of these conditions are essential however. The expected deflection range should be less than 180 degrees and preferably not greater than about 90 degrees. A recording stylus 23 marking on a chart 28 (see Figs. 2 and 3) is jointly controlled by the rotation of the two shafts 12 and 14. The stylus is on the axis of the center or indicating pivot of a four-arm link and lever system connected between the two shafts. Thus the stylus is connected with shaft 12 by a lever arm 24 secured to shaft 12 and a link 25 between the stylus and outer end of lever 24 and is connected with shaft 14 by a lever arm 26 secured to shaft 14 and a link 27 joining the outer end of lever 26 to the stylus end of link 25.

In the arrangement illustrated, the lever 24 and link 27 are about double the length of lever 26 and link 25. Also, it is assumed that lever 24 and link 27 will be approximately parallel and at about right angles to lever 26 and link 25 when the voltage and current are normal. These relations are not essential but are desirable in the interest of obtaining the most satisfactory character and disposition of the record under usual conditions. By such an arrangement changes in the position of the stylus which are due to voltage changes are at approximately right angles to changes in its position which are due to current changes under what may be considered as about the center of the range of variation of both. The angles between lever and link member should be such that movement of the indicator pivot due to rotation of shaft 12 is in general transverse to its movement due to rotation of shaft 14. Also, the voltage responsive lever arm 24 is preferably made longer than the current responsive lever arm 26 because ordinarily the voltage fluctuations are much smaller than the current variations, hence in the example given it is desirable to amplify the record of voltage variations as compared to the record of current variations by the use of the longer voltage responsive lever arm 24.

The levers and links will be of stiff light weight material joined with easily turning parallel pivots and the system will be so biased that the stylus rests lightly against the chart. If the apparatus is to be used in the position shown, it should preferably be calibrated in such position so that the influence of the weight of the linkage system on the position of the stylus will be correctly taken into consideration in such calibration. Thus one should avoid calibrating the apparatus with the chart facing up and then use it with the chart vertical. The apparatus may, however, be calibrated and used in either of such positions.

The chart 28 remains stationary during demand measurement periods. The length of such periods depends upon the desire of the user. It may be a day, a week or a month, for example. The chart paper used requires no calibration or time marks to be printed thereon and hence the expense for charts is small. A good grade of chart material suitable for the job is recommended however because the stylus may and invariably does move over the same spot many times during a demand measurement period. A wax coated chart may be used with a stylus that removes the wax. Fluid ink is not recommended for use with this recorder. Since the chart remains stationary for long periods of time and may conveniently be changed or advanced by the meter reader, no clock mechanism for advancing the chart is required and the expense and maintenance of such a device is therefore avoided.

Refer now to the explanatory diagram, Fig. 4. Let it be assumed that shaft 12 with its arm 24 has deflection characteristics represented by the graduated scale 29 and that the indication "5" of arm 24 on the scale 29 corresponds to normal voltage. Also, let it be assumed that shaft 14 with its arm 26 has deflection characteristics represented by the graduated scale 30 and that the indication "5" of the arm 26 on scale 30 corresponds to normal current. The full line positions of the link and lever system shown thus determines the normal voltage and current position of stylus 23 on chart 28. If now, the voltage be held at normal but the current be varied over the current scale range, the stylus 23 will move over the horizontally disposed arc designated "5V" at the left of the chart. The dotted line position of the link and lever system corresponding to the position of the stylus at 23' is the position for 5 volts and 8 amperes. Thus point 23 corresponds to 5 volts and 5 amperes or 25 volt-amperes and point 23' corresponds to 5 volts and 8 amperes or 40 volt-amperes. It is understood that the scale graduations chosen for descriptive purposes are arbitrary values.

The horizontally disposed arc marked 4V is made by holding the voltage at 4 on scale 29 and varying the current over the range of scale 30. Arc 6V is the current variation arc with the voltage held at 6 on scale 29.

The vertically disposed arcs marked 0, 3, 5, 8 and 10 amperes at the bottom of the chart are arcs drawn by the stylus with the current held at the values indicated when the voltage is varied considerably above and below normal. The arc 5 amperes is made by holding the current arm 26 at 5 on scale 30 and varying the voltage. The curves designated "25," "30," "40" and "50" volt-amperes at the upper side of the chart are made by holding the volt-amperes at the values indicated and varying both the voltage and current. Thus the curve "40" volt-amperes passes through the point of crossing of the 5V and 8 ampere arcs and also the point of crossing of the 4V and 10 ampere arcs and all of the other points corresponding to 40 volt-amperes likely to be traced by the stylus over the expected range of variation of current and voltage. The voltage and current scales 29 and 30 may be included as a part of the apparatus as indicated in Fig. 2.

For each instrument of the type described I propose to trace one or more charts calibrated with the instrument in the manner described having a plurality of current voltage and volt ampere calibration lines as pictured in Fig. 4. Such charts will be transparent the lines being traced on glass or transparent Celluloid and one such chart is represented in Fig. 4 having a width equal to the width of the chart 28 and having upper and lower edges identified by the lines 31 and 32. There will be one of such charts on the glass cover 33 of the instrument (see Fig. 1) properly calibrated and oriented with the stylus 23 and the outer end of the stylus will have an indicator 34 which moves close to the inner surface of the glass chart 33 so that the approximate values of current, voltage and volt-amperes may be read therefrom at any time by looking at the front of the instrument. One or more similar charts will be traced on plain transparent material such as Celluloid and be available in the office for reading records after they are removed from the recorder.

The nature of the records obtained by this instrument are represented in Fig. 6 at A, B and C. It is seen that, with plus and minus deflections of the two meters, the stylus repeatedly records on the same general area of the chart to form a group mass of intersecting and recrossing record lines and that it is the general shape, density and position and the marginal limits of such consolidated group record that is looked to for the recorded information rather than to an individual record line. The record at A indicates that during the recording period both the current and the voltage fluctuated considerably and that there was a wide variation in their product, namely volt-amperes. The central, darkest portion of the record indicates the range most frequently traced by the stylus.

The record at B indicates a considerable variation in current but a fairly uniform voltage. The record at C indicates a badly fluctuating voltage but not so great a fluctuation in current as in records A and B. The line c' drawn to the lower left in record C indicates that the current dropped to a zero value long enough for the current responsive bimetal spiral 19, Fig. 3, to cool. Now, by placing the transparent calibration scale member with its calibration lines over these records and properly orienting scale member with respect to the records, the maximum and minimum values of volt-amperes may be read off and also the current and voltage values at which such volt-amperes values occurred. The general value and nature of the load over the measurement period is also pictured.

Now, in order to determine recorded values accurately, it is necessary that the transparent scale plate be placed on the record in a correctly oriented position vertically, horizontally and at the proper angle. To facilitate this I provide for placing two or more scale plate orienting marks on the record sheet before the record sheet is advanced, removed or disturbed and the marks indicated at D, E, F, and G in Fig. 6 indicate such marks.

The instrument is preferably provided with a record marking plate 35, see Figs. 1 and 5, lying over the margin of that portion of the record sheet which is in recording position. The record sheet lies between this plate and a back writing plate 36. The plate 35 may have a slight clamping action on the record sheet and helps keep it tight and smooth and its inner margins serve as a ruler by means of which the person who removes or advances the record sheet may draw part or all of the marks D, E, F, and G with a pencil or other marker. He may at the same time record the date of removing the record and other desirable data on the record sheet. The transparent calibration scale 31—32, Fig. 4, will have similarly placed marks D, E, F, and G etched or otherwise inscribed thereon so that all that is necessary in interpreting a record after its removal from the recorder is to place the transparent scale plate thereon with the marks D, E, F, and G on both in superimposed alignment.

As indicated in Figs. 1 and 2 the chart may be continuous and be drawn from a supply spool 37 over a roller 38 to a reroll spool 39. This may be done manually by turning a thumb piece 40 on the end of the reroll spool. Springs 41 bear against the hub of the reroll spool to hold it in place and to keep it from turning easily. Hence, the chart is kept tightly stretched across the writing table 36.

If it is desired to remove the records from the recorder at the end of the measurement periods, separate short rectangular sheets may be used. These will be held in recording position by the plate 35, Fig. 5.

The voltage and current responsive elements could, of course, be of other than the thermal type. However, the thermal type of element is relatively inexpensive and can be made to have ample torque for recording purposes. It may be readily designed to have a desired amount of time lag and an averaging effect with respect to rapid fluctuations in the quantities under measurement corresponding to demand over a selected period and hence there is not so much movement of the stylus as there would be with measuring instruments having an instantaneous response characteristic. Where one is not interested in the time of occurrence of maximum demand but only on its magnitude over a given measurement period, the thermal type of measuring instrument fits in nicely with the stationary recording chart as herein described. In case one desired to obtain a more detailed record of the character described, one could use measuring instruments having a more nearly instantaneous response and advance the record sheet at more frequent intervals than is now contemplated, but not excluded from the scope of the invention. It is, however, necessary that over the measurement periods selected the record sheet remains stationary in order to record the measured quantities although their indications can be obtained at all times by noting the position of the stylus with respect to the transparent calibrating chart on the instrument cover.

For example, in Fig. 6 the vertical lines traced by the stylus between the records A, B and C when the chart is advanced indicates the lateral position of the stylus only and it is necessary to correlate both the lateral and vertical position of the stylus with respect to some known reference mark or marks before the record can be interpolated.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A recording instrument comprising a recording chart, a stylus recording on said chart, a voltmeter and an ammeter, both of the indicating type, pivoted link members joining said stylus to the deflecting elements on said meters for moving said stylus over said chart in any direction in accordance with the joint plus and minus deflections of said meters and such that the change in position of the stylus produced by variations in deflection of the ammeter are at approximately right angles to the changes in the position of the stylus which are due to the variations in deflection of the voltmeter, said chart remaining stationary over a considerable recording period whereby, with plus and minus variations in the meter deflections, the record produced crosses and recrosses itself repeatedly, such that the general shape, position and density of the composite record produced gives a direct visual indication of the average character of the voltage current and voltampere load during such period and a scale calibrated with the instrument correlated with such record by means of which the extremities of the records thus produced give the maximum and minimum values of voltage, current and voltamperes and the voltage and current at the time of maximum and minimum voltampere demand.

2. A record instrument comprising a chart, a stylus recording on said chart, a pair of meters of the deflection type for measuring variations in two different related quantities, pivoted link members joining said stylus to the deflecting members of said meters whereby the stylus is movable in any direction over said chart in response to the joint plus and minus deflections of said meters and such that the movements of the stylus due to variations in deflections of one meter are at approximately right angles to the movements of the stylus which are due to the deflections of the other meter, said chart being stationary whereby the records produced by plus and minus variations in the deflection of said meters cross and recross themselves repeatedly to produce a composite group record, which, by its general shape, position and density, gives a direct visual, comprehensive indication of the average relative variation and magnitude of the quantities measured and of their product over the complete recording time and a scale calibrated with said recording instrument for correlation with such record to indicate the maximum plus and minus measurements thus recorded on said chart.

WILLIAM H. PRATT.